Patented July 14, 1936

2,047,839

UNITED STATES PATENT OFFICE 2,047,839

METHOD OF ACCELERATING CHEMICAL REACTIONS

Erwin F. Spellmeyer, East Orange, N. J.

No Drawing. Application February 27, 1932,
Serial No. 595,670

5 Claims. (Cl. 204—9)

This invention relates, generally, to chemical reactions; and the invention has reference, more particularly, to those reactions known as hydrations and to reactions of the reverse nature known as dehydrations.

As is well known to those skilled in the art, hydrations are chemical reactions between substances, which reactions result in the chemical combination of water or its elements to form new compounds. Dehydrations on the other hand, are chemical reactions between substances resulting in the formation of water along with new compounds, the water being a by-product of the reactions.

In some instances hydrations or dehydrations occur spontaneously as the result of merely mixing certain substances together in solution or otherwise. In many instances, however, mixing of substances together does not immediately result in the desired hydrations or dehydrations, but such reactions may require long periods of time before consummation. In some instances it may take months or even years to effect the complete hydration or dehydration desired in the absence of catalysts.

Heretofore, it has been common practice to accelerate such reactions by the use of catalysts so that the same can be completed in a number of hours or days, as the case may be. Also, it is common to use heat to hasten the reaction and in some instances pressure is also applied along with the heat. It so happens, however, that the very catalysts which are used to produce hydrations in chemical reactions, can also produce dehydrations in the same reactions, with the result that after a hydration process has reached a certain point, no further hydration can take place because thereafter the dehydration produced by the catalysts used, offsets further hydration. This is due to the establishment of a balance between all of the chemicals involved in the reactions, and the catalysts cannot thereafter continue a hydration or dehydration reaction. Thus, when using acids or bases as catalysts in such reactions, as the saponification of esters by strong mineral acids, or by strong bases, the inversion of sugar, the decomposition of glucosides, or of acetals, and, inversely in the production of esters in the presence of small amounts of mineral acids, the active factors of the catalysts appear to be the ions resulting from the electrolytic dissociation of the acid or base used. The activity of the catalyst is closely connected with the amount of this dissociation and the velocity is proportional to the number of free ions in the solution.

In the saponifications catalyzed by soluble bases, the active factors are the hydroxyl ions resulting from the electrolytic dissociation of the base, and we are justified in believing that the attack on the molecule of ester, ROA, derived from the oxy-acid, AOH, is the work of the OH ions derived from the base. Thus, when using caustic potash, we would have:

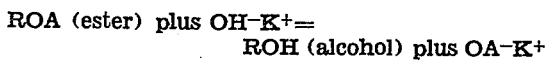

The ionized salt, AOK, is formed in the solution, but as the corresponding organic acid, AOH, is only slightly dissociated into the ions, water hydrolizes the salt to give:

The acid, AOH, is thus liberated and the ions of the original caustic potash are free to recommence their catalytic action.

In the saponification of esters by acids, it is the hydrogen ions that cause the desired effect. Thus, when using hydrochloric acid, we have:

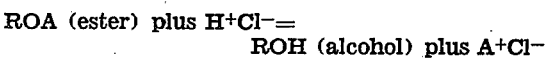

There is an immediate reaction with water to give:

The regenerated ions of the initial molecule of hydrochloric acid can thus repeat the reaction indefinitely. Also, esterification is brought about according to the same mechanism but in the inverse direction.

The velocity of a hydrolysis of this sort is proportional to the number of ions that are active in producing the same. When using strong acids at such dilutions that they may be regarded as completely dissociated, the effect will be independent of the nature of the acid and proportional only to the ion concentration. This has been verified for hydrochloric, hydrobromic, hydroiodic, nitric and chloric acids. The same is true when using strong soluble bases, such as potassium, sodium, barium, and calcium hydroxides in sufficiently dilute solutions. Thus, it is the ions derived from both acids and bases which account for the chemical activity of the catalysts when they are used for effecting chemical reactions known as hydrations and dehydrations, and, further, the greater the number of these ions present, the greater will be the velocity of the reactions.

The principal object of the present invention is to provide a novel method of accelerating hydrations and dehydrations.

Another object of the present invention lies in the provision of a novel method which may employ the same chemicals and catalysts as are now used to produce hydrations and dehydrations, but which method includes the use of alternating current for greatly hastening the completion of such reactions.

Still another object of the present invention is to provide a novel method of the above character employing alternating current to not only greatly accelerate reactions involving hydrations and dehydrations, but which method in many instances eliminates the common necessity of applying external heat to complete the reactions and also in some instances eliminates the use of catalysts.

As a result of considerable research, I discovered that when performing reactions involving either hydrations or dehydrations and while using the same chemicals and catalysts as are now being commonly used, if two poles (i. e. electrical conductors, such as lead, platinum or chromium plated posts) are inserted into the mixture at a distance from one another and alternating current is supplied to the poles for passage through the mixture, the hydration or dehydration, as the case may be, is greatly speeded up. I have found that the passage of the alternating current through the mixture, which current may be supplied, for example, at 110 volts and 60 cycles, so rapidly accelerates the reaction taking place in many cases, that after a short time it is necessary to reduce the voltage applied to the poles as by inserting a resistance in the electrical circuit in order to prevent the mixture from boiling too violently. In many cases where external heat is now commonly applied to complete the reaction, I have found that when using alternating current, such external heat is unnecessary, because the resistance which is offered by most mixtures to the flow of current together with the heat which is liberated by many chemical reactions, is more than sufficient for the requirements of the reactions.

A possible theory which may be advanced to account for this phenomenal action of alternating current in greatly accelerating reactions involving hydrations or dehydrations, is that the passage of the current in alternate directions through the mixture acts to greatly increase the number of ions present in the mixture. As has heretofore been pointed out, the greater the number of ions in a mixture, the more rapidly a hydration or dehydration takes place. Since the alternating current flows in both directions at rapidly recurring intervals, it would appear that no chemical changes or decomposition of the chemicals of the mixture takes place, any material which is decomposed being immediately recombined by the reversal of the current. Such, however, is apparently not the case in so far as the production of ions is concerned, because from all tests it appears that the passage of the alternating current immediately greatly increases the number of ions present in the mixture, thereby correspondingly increasing the velocity of the reaction.

My experiments with direct current in either hydration or dehydration work has proved that such current does not increase the ionization of the mixture. In some cases direct current does not cause any decomposition and in other cases the same causes one or more of the constituents to be decomposed without affecting the remaining constituents, thereby almost invariably resulting in retarding the desired reactions. Direct current therefore cannot be used for accelerating either hydrations or dehydrations.

I have found that the use of alternating current greatly accelerates the hydrations or dehydrations regardless of the nature of the catalysts used in such reactions. Thus, it is immaterial whether acids, bases or salts are used as catalysts, the alternating current in each such case has the effect of acelerating the reaction. Oftimes when using alternating current by my method, catalysts may be done away with altogether. For example, when carrying out a hydration reaction involving the conversion of a disaccharide, such as table sugar, into monosaccharide or glucoses, it was found that the usual acid catalyst, such as hydrochloric acid or sulphuric acid could be eliminated. In carrying out this reaction, I dissolved 100 parts by weight of ordinary table sugar in 100 parts by weight of water. This mixture was then treated with 110 volt, 60 cycle alternating current for thirty minutes, or in other words, the alternating electric current was passed through the solution for thirty minutes, at the end of which time the disaccharide was completely converted into monosaccharide. During this reaction, the only apparent evidence that any chemical reaction was taking place, was in that the solution warmed up somewhat and became slightly yellow and thereafter turned water-white again. The reason that no catalyst was required for the reaction was due to the fact that the sugar itself contained impurities which are electrolytes and allow the current to flow. The sugar itself also probably possesses the property of ionization to a slight degree. In the absence of alternating current, it is necesary to use an acid catalyst and the reaction would take approximately three hours to complete as against thirty minutes by my method.

Another example of a hydration is the conversion of a polysaccharide, such as starch into a monosaccharide or gluocoses. In carrying out this reaction, I mixed together twenty parts by weight of starch, 80 parts by weight of water and three parts by weight of sulphuric acid (94%). In carrying out this reaction, it was necessary to protect the poles or electrodes by the use of porous sleeves or cups, such as aluminum oxide cups, to prevent the following of the electrodes or poles proper and to prevent sparking. The mixture was stirred constantly to keep the starch in suspension while the alternating current was passed therethrough. The current itself generated enough heat to start and continue the reaction. Within two hours the polysaccharide had been completely converted into monosaccharide, the temperature at all times being held below the boiling point of water. In the absence of the alternating current this reaction would have taken approximately three hours to complete and it would also have been necessary to apply between five to fifteen atmospheres of pressure to the mixture during the reaction.

As an example of the use of alternating current in accelerating a dehydration reaction, the manufacture of esters may be taken as a typical case. In carrying out this reaction, I intermixed 100 parts by weight of technical oleic acid, 100 parts by weight of ethyl alcohol (98%) and 5 parts by weight of sulphuric acid (94%). This mixture was treated by passing alternating current therethrough for fifteen minutes, using 110 volt, 60 cycle current. The voltage was then dropped to about 60 volts for fifteen minutes. The acid catalysts and excess alcohol were then removed by shaking with brine water until free from both. The ester layer was dehydrated and titrated with .5/N caustic potash in neutralized alcohol. The uncombined fatty acids were calculated as oleic acid (molecular weight 282) and found to be 2.58%. The ester conversion in this case was 97.42% and the total time consumed was about one-half hour. When using the ordinary method without alternating current, this reaction would consume approximately twenty hours.

To form ethyl acetate by dehydration I intermixed 46.06 parts by weight of ethyl alcohol (95%), 60.04 parts by weight of glacial acetic acid (98%) and 1.00 part by weight of sulphuric acid (94%). Alternating current at 50 volts, 60 cycles was passed through this mixture for fifteen minutes when the ethyl acetate formed was found to be 60.8%. The remainder of the original solution was then boiled for one hour while using a large reflux condenser, but no more ester was formed.

Although 110 volt, 60 cycle current was used in the above illustrated examples for reasons of convenience, the said current being easily obtainable, actually current of a greater or even lesser frequency may be used.

While I have given above but a few typical examples of hydrations and dehydrations which were greatly accelerated by the use of alternating current, I have actually performed many such reactions using many different substances and in all such cases the passage of the alternating current had the effect of accelerating the reaction. Therefore, my invention is not limited to any particular reaction or reactions, but is applicable to hydrations and dehydrations generally and is claimed accordingly.

What is claimed is:

1. The method of accelerating hydration and dehydration reactions resulting from the intermixture of one of the organic substances, esters and saccharides with a catalyst of the group consisting of inorganic acids and bases, said organic substance and catalyst being in their liquid phase, which method comprises the passing of alternating current through the intermixed substance and catalyst.

2. The method of accelerating a hydration reaction resulting from the mixture of one of the two organic substances disaccharide and polysaccharide, with an inorganic acid catalyst in an aqueous solution, which method comprises the passing of alternating current through the mixture.

3. The method of accelerating a dehydration reaction resulting from the mixture of an organic acid, an alcohol and an inorganic acid catalyst, which method comprises the passing of alternating current through the mixture.

4. The method of accelerating a hydration reaction resulting from the mixture of a disaccharide and an inorganic acid catalyst in an aqueous solution, which method comprises the inserting of spaced electrically conducting poles into the intermixed substances and passing an alternating current between the spaced poles.

5. The method of accelerating a hydration reaction resulting from the mixture of a polysaccharide and an inorganic acid catalyst in an aqueous solution, which method comprises the inserting of spaced electrically conducting poles into the intermixed substances and passing an alternating current between the spaced poles.

ERWIN F. SPELLMEYER.